(Model.)

A. ADSIT.
INSERTIBLE SAW TOOTH.

No. 317,698. Patented May 12, 1885.

WITNESSES:
D. F. McArdle.
C. Sedgwick

INVENTOR:
A. Adsit
BY Munn & Co.
ATTORNEYS.

UNITED STATES PATENT OFFICE.

ABRAM ADSIT, OF TRAVERSE CITY, MICHIGAN.

INSERTIBLE SAW-TOOTH.

SPECIFICATION forming part of Letters Patent No. 317,698, dated May 12, 1885.

Application filed March 6, 1885. (Model.)

*To all whom it may concern:*

Be it known that I, ABRAM ADSIT, of Traverse City, in the county of Grand Traverse and State of Michigan, have invented a new and useful Improvement in Circular and other Saws, of which the following is a full, clear, and exact description.

This invention more particularly relates to insertible-tooth saws for sawing lumber. It will here be shown as applied to a saw or saw-blade, in part, in which a well-known form of insertible saw-tooth is used, consisting of an insertible mouth-piece and separate cutting-bit; but is also applicable to saws in which insertible teeth are used having no separate mouth-piece, inasmuch as the improvement is in the throat of the tooth.

The invention consists of the combination of parts and their construction, substantially as hereinafter fully set forth and claimed.

Reference is to be had to the accompanying drawings, forming a part of this specification, in which similar letters of reference indicate corresponding parts in all the figures.

Figure 1:
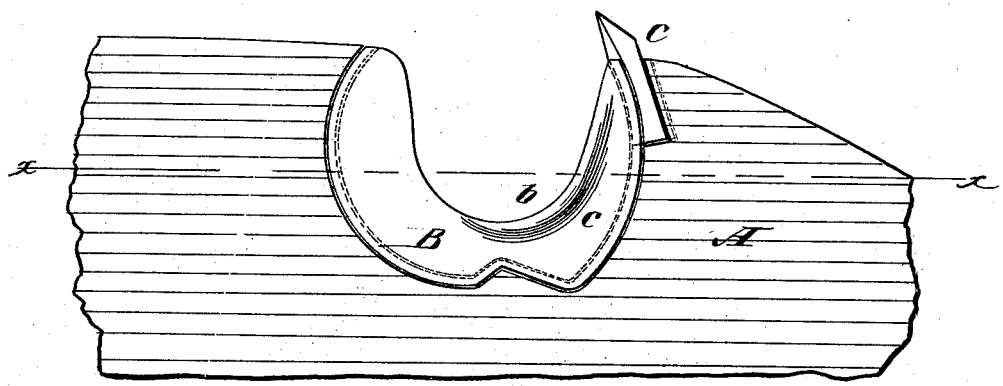
Figure 2:
Figure 3:
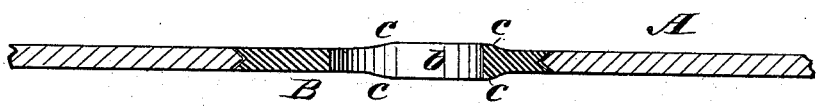

Figure 1 represents a side view of a saw, in part, with an insertible saw-tooth and mouth-piece embodying my invention. Fig. 2 is an edge view of the same, and Fig. 3 a section thereof on the line $x\ x$ in Fig. 1.

A indicates the body or blade of the saw, in part; B, the insertible mouth-piece of one of its teeth, and C the insertible or separate cutting-bit of the tooth.

As ordinarily constructed, the edge $b$ of the mouth-piece, which forms the throat, is of the same width or thickness as the remainder of the mouth-piece or rest of the blade. This causes the mouth-piece soon to become rounding and even sharp on its edge, by reason of the constant friction of the sawdust thereon; in fact, it often becomes so thin in a short time that the sawdust is forced by or past the tooth on each side of the mouth-piece in such quantities that a great pressure is thrown on the saw, which accordingly soon becomes heated, when its run is impaired and it fails to make a good cut of the lumber. The consequence of this is it is frequently necessary to renew the mouth-pieces, when worn, for new ones, in order that the sawdust may be carried out of the log in the throats of the saw or the teeth thereof, instead of being forced back along the sides of the mouth-pieces and onto the blade or body of the saw. To remedy this defect, I make the edge $b$ of the mouth-piece or throat of the tooth of greater width or thickness, as at $c$, than the saw-blade, by giving said portion a rounded swell on its sides and giving it a vanishing or tapering finish at its ends, such swelled part extending from near the cutting part of the tooth to or beyond the innermost or back portion of the mouth-piece.

By this construction the sawdust will be carried out of the log in the mouth-pieces or throats of the teeth, which will cause the saw to keep cool and to do its work freely and well, and it will add materially to the durability of the saw, and give increased strength to the mouth-piece, without leaving a shoulder beneath the bit that, when worn a little sharp, helps to scatter the sawdust each way instead of carrying it out of the log.

Having thus fully described my invention, I claim as new and desire to secure by Letters Patent—

1. The insertible mouth-piece B of the saw, having rounded and tapering side swells, $c\ c$, on opposite sides of its exposed edge portion $b$, said swells extending from near the cutting part of the tooth to or beyond the innermost or back portion of the mouth-piece, in combination with the blade A and tooth C, essentially as described.

2. The combination, with the blade or plate A, of the insertible mouth-piece B, having rounded and tapering side swells, $c\ c$, on opposite sides of its exposed edge portion $b$, said swells extending from near the cutting part of the tooth to or beyond the innermost or back portion of the mouth-piece, and the insertible bit C, substantially as specified.

ABRAM ADSIT.

Witnesses:
SAMUEL GARLAND,
GEO. W. HALL.